United States Patent
Fritsche et al.

(10) Patent No.: US 9,623,725 B2
(45) Date of Patent: Apr. 18, 2017

(54) AIR VENT

(75) Inventors: Uwe Fritsche, Remseck am Neckar (DE); Kuno Zeller, Stuttgart (DE); Dieter Reisinger, Vaihingen/Enz (DE); Martin Fieger, Ludwigsburg (DE)

(73) Assignee: MAHLE International GmbH, Stuttgart (DE)

( * ) Notice: Subject to any disclaimer, the term of this patent is extended or adjusted under 35 U.S.C. 154(b) by 1672 days.

(21) Appl. No.: 12/912,992

(22) Filed: Oct. 27, 2010

(65) Prior Publication Data

US 2011/0105009 A1    May 5, 2011

(30) Foreign Application Priority Data

Oct. 27, 2009 (DE) .................. 10 2009 050 885

(51) Int. Cl.
   *B60H 1/34*     (2006.01)
   *F24F 13/065*   (2006.01)
   *F24F 13/10*    (2006.01)
   *F24F 13/00*    (2006.01)

(52) U.S. Cl.
   CPC .................. *B60H 1/3457* (2013.01)

(58) Field of Classification Search
   None
   See application file for complete search history.

(56) References Cited

U.S. PATENT DOCUMENTS

| | | | | |
|---|---|---|---|---|
| 2,223,884 A | * | 12/1940 | Bolan | 261/106 |
| 2,431,146 A | * | 11/1947 | Steele | 454/148 |
| 2,663,243 A | * | 12/1953 | Wunderlich | B60H 1/00792 15/313 |
| 2,681,608 A | * | 6/1954 | Wunderlich | B60H 1/248 454/163 |
| 2,700,927 A | * | 2/1955 | Jordan | 454/131 |
| 2,705,623 A | * | 4/1955 | Glassenhart et al. | 261/29 |
| 3,630,040 A | * | 12/1971 | Goldfarb | 62/5 |
| 3,630,272 A | * | 12/1971 | Kelly | 60/676 |
| 3,919,929 A | * | 11/1975 | Harmon | F24F 13/06 454/305 |

(Continued)

FOREIGN PATENT DOCUMENTS

| | | |
|---|---|---|
| DE | 100 36 776 A1 | 2/2002 |
| DE | 103 39 339 A1 | 3/2005 |

(Continued)

*Primary Examiner* — Gregory Huson
*Assistant Examiner* — Eric Gorman
(74) *Attorney, Agent, or Firm* — Muncy, Geissler, Olds & Lowe, P.C.

(57) ABSTRACT

An air vent for a vehicle interior ventilation system including a diffuse air flow duct with a diffuse outlet opening for discharging the air as a diffuse or swirling jet, a movable connecting sleeve with an inflow opening and an outflow opening as a spot outlet opening, which forms a spot air flow duct at a spot outlet opening. Through movement of the connecting sleeve, different discharge directions of the spot jet from the spot outlet opening can be adjusted. The air discharged through the connecting sleeve is redirectable substantially completely in different discharge directions with pivoting of the connecting sleeve. The connecting sleeve has a greater cross-sectional area at the inflow opening than at the outflow opening and at least one air guiding wall is formed in the connecting sleeve.

13 Claims, 4 Drawing Sheets

(56) References Cited

U.S. PATENT DOCUMENTS

| | | | |
|---|---|---|---|
| 4,594,084 A * | 6/1986 | Lopez | 62/5 |
| 4,979,429 A * | 12/1990 | Soethout et al. | 454/162 |
| 5,364,303 A * | 11/1994 | Terry | 454/155 |
| 6,086,474 A * | 7/2000 | Dohring | 454/143 |
| 6,102,660 A * | 8/2000 | Lee | 416/146 R |
| 6,220,387 B1 * | 4/2001 | Hoppes et al. | 181/259 |
| 6,241,601 B1 * | 6/2001 | Han et al. | 454/268 |
| 6,415,857 B1 * | 7/2002 | Nakamura et al. | 165/204 |
| 6,887,148 B2 * | 5/2005 | Biasiotto | B60H 1/00664 454/121 |
| 7,517,280 B2 * | 4/2009 | McConnell et al. | 454/162 |
| 2002/0129933 A1 * | 9/2002 | Ozeki et al. | 165/203 |
| 2003/0022616 A1 * | 1/2003 | Stiehl | 454/162 |
| 2004/0055570 A1 * | 3/2004 | Bielicki et al. | 123/402 |
| 2004/0063397 A1 * | 4/2004 | Dippel | B60H 1/3407 454/154 |
| 2005/0075064 A1 * | 4/2005 | Omiya et al. | 454/162 |
| 2005/0176364 A1 * | 8/2005 | Gehring | B60H 1/3414 454/155 |
| 2006/0052050 A1 * | 3/2006 | Malott et al. | 454/307 |
| 2006/0216214 A1 * | 9/2006 | Brown et al. | 422/124 |
| 2007/0066212 A1 * | 3/2007 | Klingler | B60H 1/3457 454/155 |
| 2007/0111652 A1 * | 5/2007 | Klingler | B60H 1/345 454/155 |
| 2007/0138797 A1 * | 6/2007 | Reidy et al. | 290/44 |
| 2008/0032618 A1 * | 2/2008 | Katoh et al. | 454/143 |
| 2008/0105754 A1 * | 5/2008 | Baruschke | B60H 1/00735 236/91 F |
| 2008/0119125 A1 * | 5/2008 | Guerreiro | 454/75 |
| 2009/0255501 A1 * | 10/2009 | Honzawa et al. | 123/184.53 |
| 2014/0030974 A1 * | 1/2014 | D'Angelo | B60H 1/3457 454/152 |

FOREIGN PATENT DOCUMENTS

| | | |
|---|---|---|
| DE | 10 2007 010 795 A1 | 9/2008 |
| DE | 20 2008 008 827 U1 | 12/2008 |
| DE | 10 2008 002 958 B3 | 10/2009 |
| EP | 1 972 475 A1 | 9/2008 |
| WO | WO 2005/021301 A1 | 3/2005 |

* cited by examiner

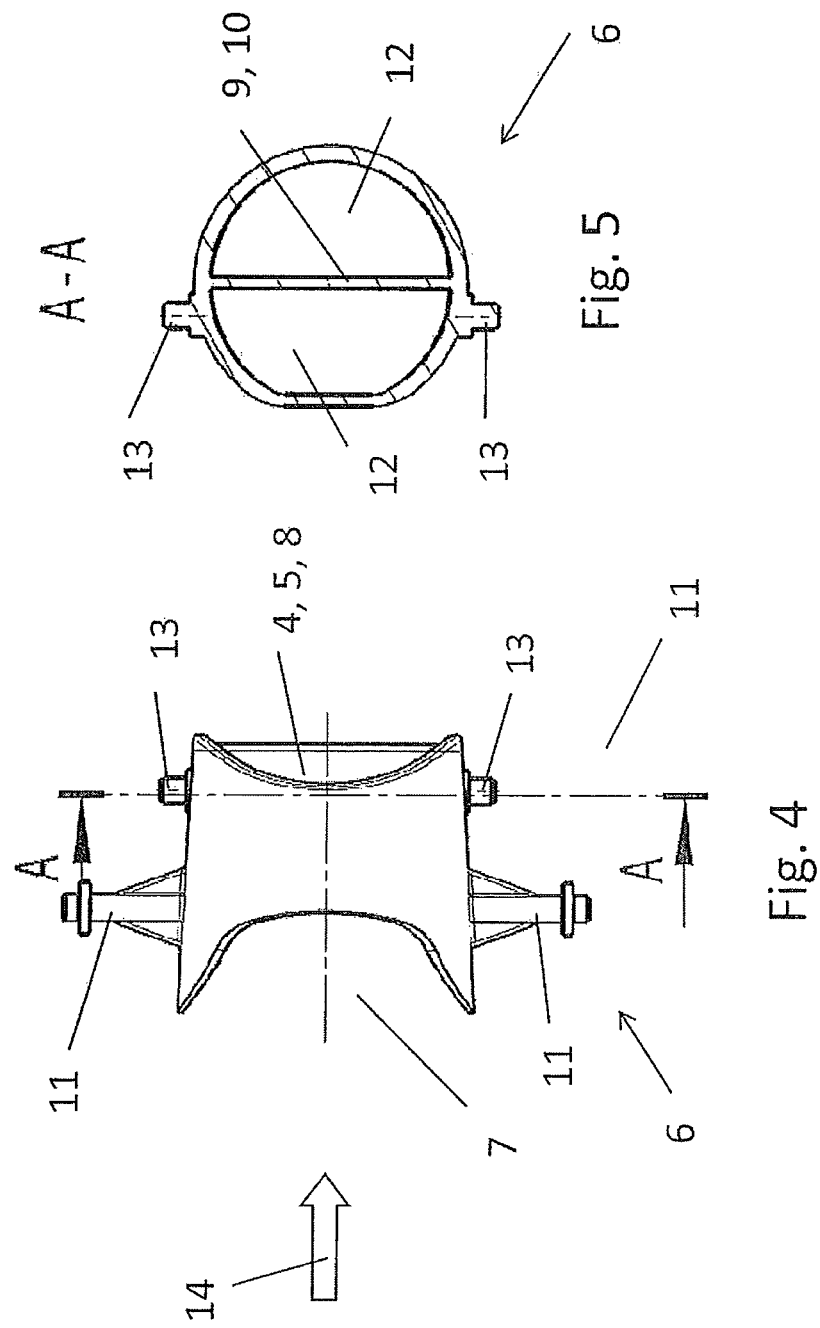

AIR VENT

This nonprovisional application claims priority under 35 U.S.C. §119(a) to German Patent Application No. 10 2009 050 885.6, which was filed in Germany on Oct. 27, 2009, and which is herein incorporated by reference.

BACKGROUND OF THE INVENTION

Field of the Invention

The invention relates to an air vent and to a motor vehicle HVAC system.

Description of the Background Art

Air vents are used in motor vehicles to supply air into an interior of the motor vehicle. The air supplied into the interior via the air vent is heated and/or cooled in an HVAC system, if necessary.

In this regard, air vents are known, which have diffuse outlet openings and spot outlet openings. Air can be discharged from the diffuse outlet openings as a diffuse or swirling jet and the air can be discharged from the spot outlet openings in each case as a spot jet. Air vents of this type increase the comfort within a motor vehicle, because the air discharged from the air vents can be discharged differently, i.e., as a diffuse or swirling jet and/or as a spot jet. To control the outflow direction of the air discharged from the spot outlet opening, air vents are known that have a movable connecting sleeve. The connecting sleeve is used in this case as an end of a spot air flow duct and due to pivoting can discharge the air as a spot jet in different outflow directions. During pivoting of the connecting sleeve to the right, the spot jet is therefore diverted, for example, to the right. The connecting sleeve in this case has an inflow opening for introducing the air into the connecting sleeve and an outflow opening for discharging the air as a spot jet. Leakage air can occur during the introduction of air into the connecting sleeve at the inflow opening, so that as a result the amount of air passed through the connecting sleeve is reduced. This is not desirable, because less air can be discharged thereby as a spot jet from the air vent, and in general this air is supplied to a diffuse outlet opening, arranged concentrically around the connecting sleeve, or a diffuse air flow duct. During pivoting of the connecting sleeve, the air passed through the connecting sleeve, is redirected at the connecting sleeve, so that because of the large cross-sectional area of the flow space within the connecting sleeve the air emerges from the spot outlet opening, without being directed sufficiently parallel, i.e., also provided with swirls.

European Pat. App. No. EP 1 972 475 A1, which is incorporated herein by reference, shows an air vent with at least two air guiding channels arranged parallel to one another, whereby for each of the air guiding channels an air flow with diffuse flow characteristics and/or an air flow with directed flow characteristics can be adjusted and in an interaction zone, arranged in the flow outlet side area of the air guiding channels, the overall flow characteristics can be adjusted by mixing of the air flows of the air guiding channels.

SUMMARY OF THE INVENTION

It is an object of the present invention to provide an air vent and a motor vehicle HVAC system, in which the air, discharged through the connecting sleeve as a spot air flow duct, can be redirected essentially completely in different outflow directions with pivoting of the connecting sleeve essentially without swirl formation within the connecting sleeve, and little air leakage occurs during the introduction of air into the connecting sleeve. Further, the air vent is to require little structural space.

This object is achieved with an air vent, particularly for a vehicle interior ventilation system, comprising at least one diffuse air flow duct with at least one diffuse outlet opening for discharging the air as a diffuse or swirling jet, at least one spot air flow duct with at least one spot outlet opening for discharging the air as a spot jet, at least one movable connecting sleeve with an inflow opening and an outflow opening as a spot outlet opening, and the at least one connecting sleeve forms the at least one spot air flow duct at the at least one spot outlet opening, and by means of movement of the at least one connecting sleeve different outflow directions of the spot jet from the at least one spot outlet opening can be adjusted, whereby the at least one connecting sleeve has a larger cross-sectional area, e.g., by at least 5%, 10%, 20%, or 30% larger cross-sectional area, at the inflow opening than at the outflow opening, and/or at least one air guiding wall is formed in the connecting sleeve. Because of the larger cross-sectional area of the connecting sleeve at the inflow opening in comparison with the outflow opening, the air to be supplied to the at least one connecting sleeve can be supplied in controlled manner and with less leakage air within the air vent. Thereby losses of air, to be supplied to the at least one connecting sleeve, as a spot jet can be reduced. The at least one air guiding wall within the flow space of the at least one connecting sleeve canalizes and divides the flow space of the connecting sleeve into partial flow compartments, so that as a result also with considerable pivoting of the at least one connecting sleeve and thereby an associated considerable diversion of the air from the inflow opening to the outflow opening at the at least one connecting sleeve, furthermore, a controlled and spot-like discharge of air at the outflow opening of the at least one connecting sleeve is assured. The at least one air guiding wall thereby canalizes the flow space within the at least one connecting sleeve, so that as a result swirling within the at least one connecting sleeve is essentially ruled out. The at least one connecting sleeve has any desired cross section; it is, e.g., circular, ellipsoidal, or rectangular.

The at least one connecting sleeve has a conical shape with a cross-sectional area that becomes smaller in the air flow direction. Because of the conical shape of the at least one connecting sleeve, an essentially uniform reduction in the cross-sectional area occurs from the outflow opening to the inflow opening, so that as a result in an advantageous manner the flow losses within the at least one connecting sleeve are reduced and no flow barriers, for example, steps, for reducing the cross-sectional area, occur.

In an embodiment, the at least one connecting sleeve has a greater width and/or a greater height at the inflow opening than at the outflow opening.

In an embodiment, the at least one connecting sleeve can be made rotationally symmetric. The axis of rotation, relative to which the at least one connecting sleeve is made rotationally symmetric, thereby preferably corresponds to a central axis and/or is parallel to a flow direction of the air passed through the at least one connecting sleeve.

The at least one connecting sleeve can be pivotable. In an embodiment, the at least one connecting sleeve can be pivotable about a horizontal or a vertical swivel axis.

In an embodiment, the air vent comprises a mechanism, by which the connecting sleeve can be moved by means of a control element arranged on the outside on the air vent. For this purpose, the air vent has, for example, an adjustment wheel or a translationally movable actuating element, by which the connecting sleeve can be moved by means of the mechanism and by means of the articulation points arranged on the connecting sleeve.

The at least one air guiding wall can be directed essentially parallel to an axis of the at least one connecting sleeve or an air flow direction in the at least one connecting sleeve.

In another embodiment, the at least one air guiding wall is oriented parallel to the axis of the at least one connecting sleeve or the air flow direction in the at least one connecting sleeve with a deviation of less than 20°, 10°, or 5°.

The at least one air guiding wall is flat. The at least one air guiding wall therefore has a flat surface, i.e., for example, is not provided with curvatures, so that as a result a directed conducting of the air with essentially parallel flow lines within the connecting sleeve is assured. In this way, the formation of swirls within the at least one connecting sleeve can be essentially ruled out or reduced.

In another embodiment, the at least one air guiding wall is formed completely continuous within the flow space of the at least one connecting sleeve, so that the at least one air guiding wall divides the flow space within the at least one connecting sleeve into at least two totally separate partial flow compartments. The at least one air guiding wall is therefore formed continuous within the at least one connecting sleeve; i.e., in a vertical orientation, for example, of the at least one air guiding wall, the at least one air guiding wall is formed completely continuous vertically.

Alternatively, the air guiding wall is not formed along the full length within the flow space of the at least one connecting sleeve, but particularly only over an area of less than 80%, 70%, 60%, 50%, 40%, 30%, or 20% of the length of the connecting sleeve. Preferably, an air guiding wall of this type is arranged at the inlet, outlet, or in the middle, at a distance to the inlet or outlet, of the connecting sleeve. It is also conceivable for two or more air guiding walls to be arranged one behind the other, whereby a gap remains in each case between the individual air guiding walls.

In a supplementary variant, the air vent has only one air guiding wall.

In another variant, the one air guiding wall is formed as a center wall in the at least one connecting sleeve, so that the center wall divides the flow space within the at least one connecting sleeve into only two totally separate, essentially equally sized partial flow compartments.

In another variant, a swirl generator is arranged in the flow direction upstream of the at least one connecting sleeve.

In an additional embodiment, a spot air flow duct is formed within the swirl generator.

In an additional embodiment, the swirl generator is formed concentrically around the spot air flow duct.

In another embodiment, the at least one connecting sleeve is arranged within the at least one diffuse air flow duct and/or the air vent comprises a housing and the at least one connecting sleeve is arranged within the housing and preferably the at least one diffuse air flow duct is bounded by the housing.

In an additional embodiment, the at least one air guiding wall divides the flow space within the at least one connecting sleeve into partial flow compartments.

The invention relates further to a motor vehicle HVAC system, whereby the vehicle HVAC system comprises at least one air vent described in this property rights application.

The motor vehicle HVAC system can have two air vents, one each for a driver side and a passenger side, and the position of the at least one connecting sleeve can be controlled separately or independently of one another or coupled or combined for the driver side and the passenger side.

In an embodiment, the positions of the at least one connecting sleeve can be set infinitely variable. The air vent therefore can be operated especially simply with an adjustment wheel, for example.

In another embodiment, the at least one spot outlet opening is formed in the cross section within the at least one diffuse outlet opening and/or the at least one diffuse outlet opening is formed concentrically around the at least one spot outlet opening.

In another embodiment, the motor vehicle HVAC system comprises a coolant evaporator and/or a fan and/or a heater and/or an air filter.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 is a side view of a connecting sleeve of the air vent according to FIG. 1;

FIG. 5 is a section A-A according to FIG. 4 of the connecting sleeve.

DETAILED DESCRIPTION

Air vent 1 is used to supply air to a motor vehicle HVAC system (not shown) as a spot jet and/or as a diffuse or swirling jet into the interior of a motor vehicle.

Figure 1:
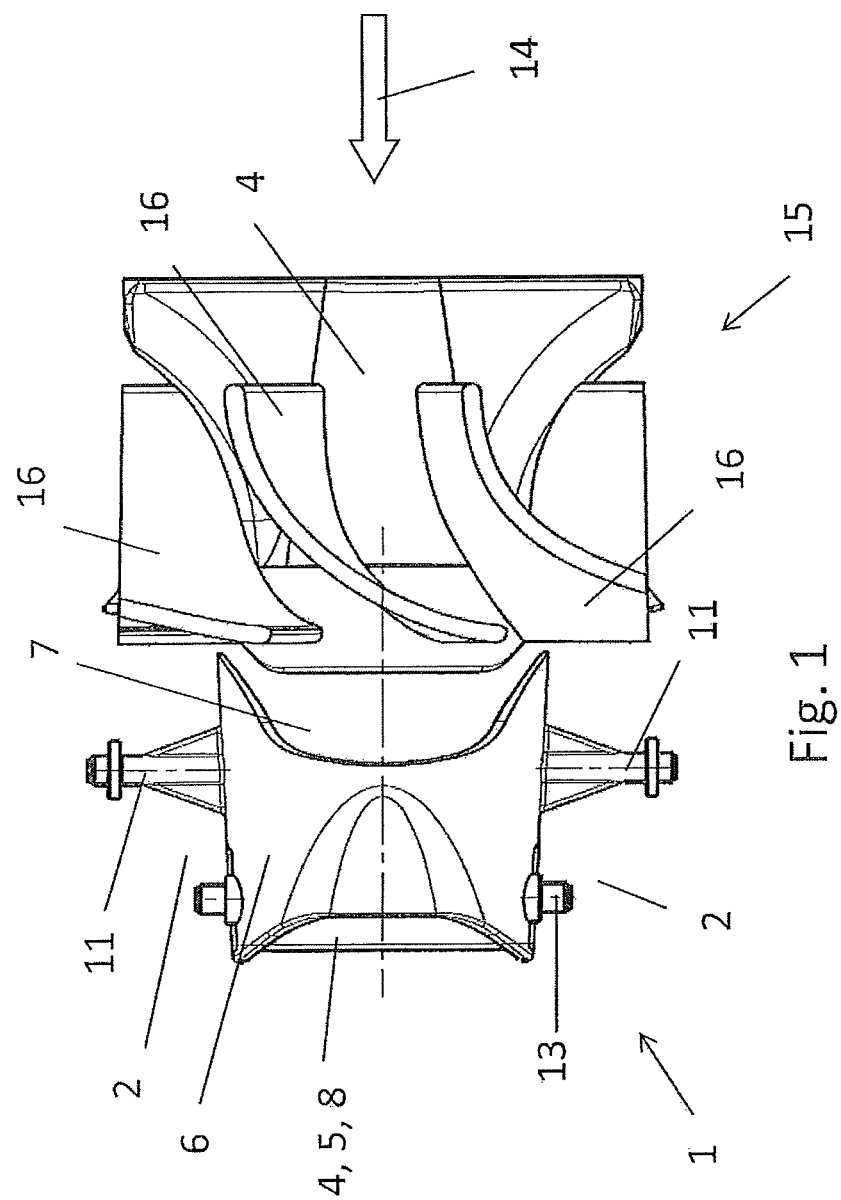
FIG. 1 is a side view of an air vent without a housing.
Figure 2:
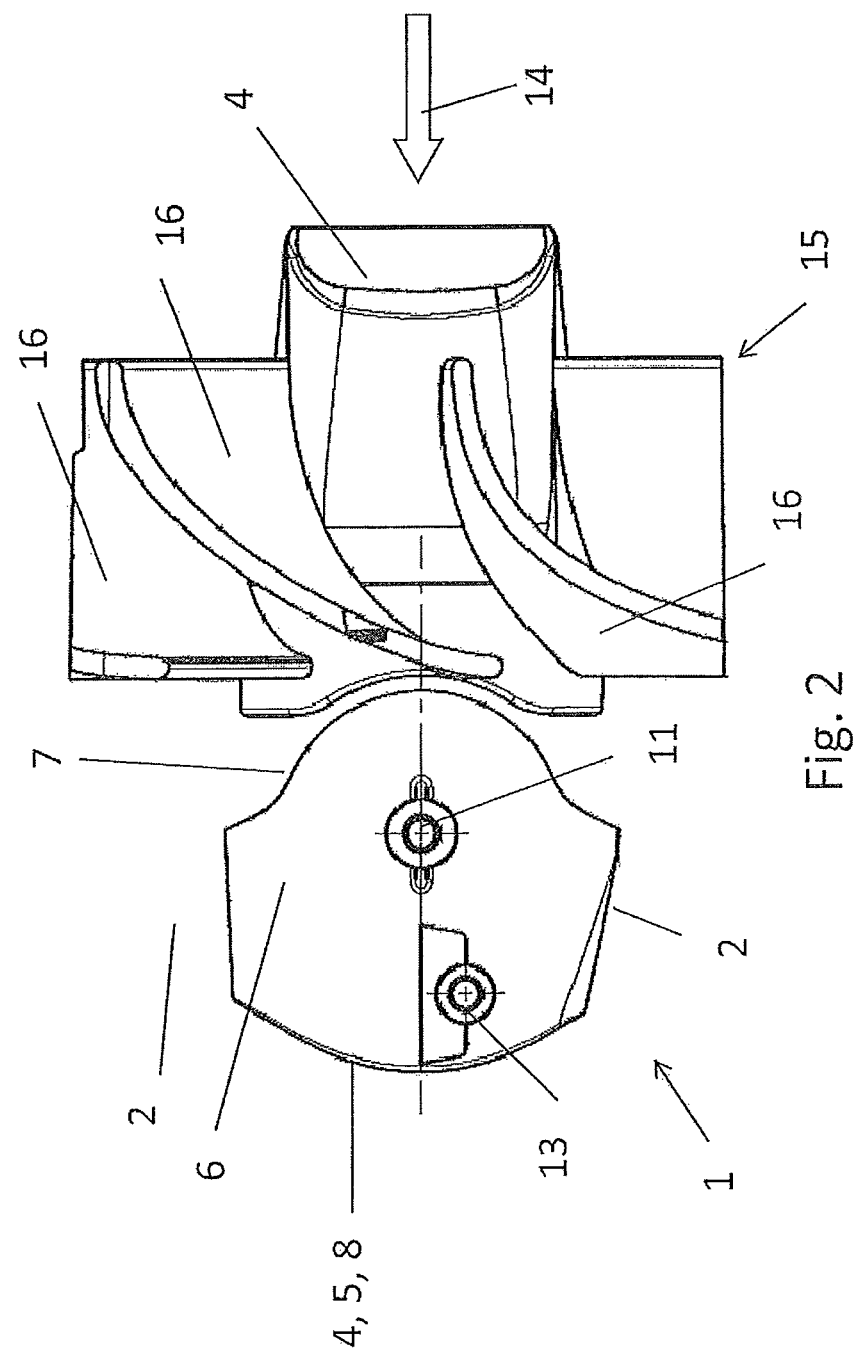
FIG. 2 is a top plan view of the air vent according to FIG. 1.
Figure 3:
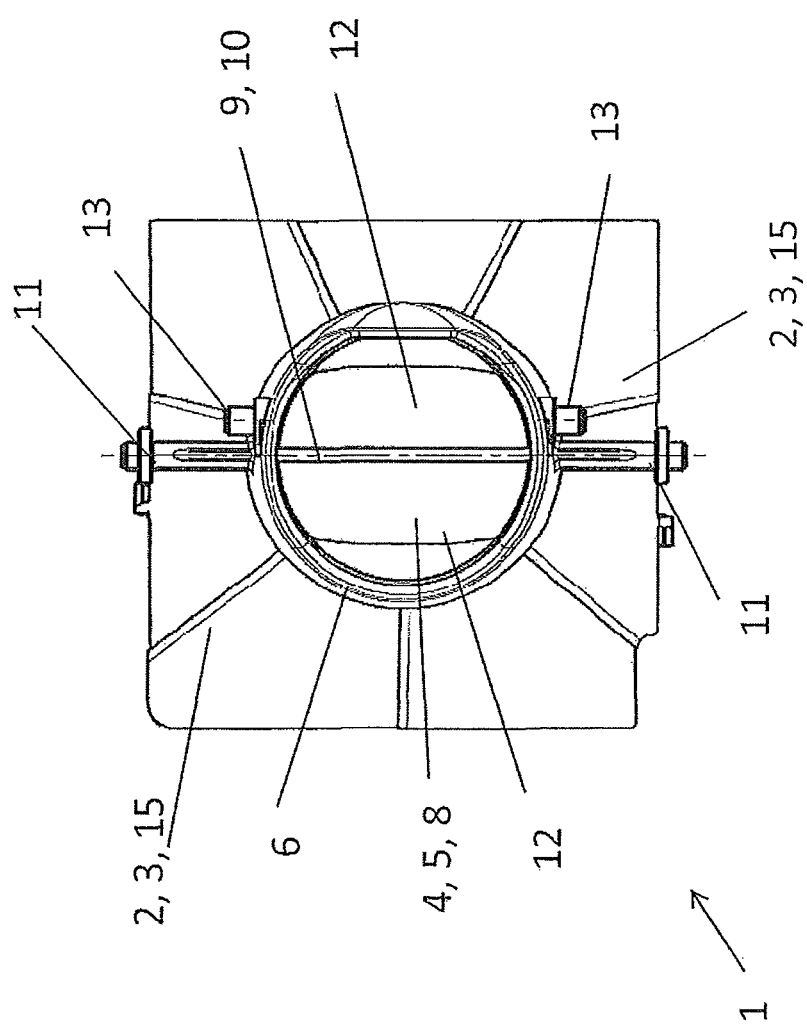
FIG. 3 is a front view of the air vent according to FIG. 1.

A connecting sleeve 6 and a swirl generator 15 are arranged within a housing (not shown) of air vent 1. The air in this regard flows through air vent 1 within the housing (not shown), first through swirl generator 15 and then connecting sleeve 6. Swirl generator 15 has spiral air guiding devices 16 (FIGS. 1 and 2) by means of which the air is diverted into a diffuse or swirling jet. A spot air flow duct 4 is formed within the spiral air guiding devices 16 (FIGS. 1 and 2). After the air directed by the spiral air guiding devices 16 emerges at swirl generator 15, the air is discharged at air vent 1 at a diffuse outlet opening 3 (FIG. 3). The flow space, which is arranged or formed between the housing (not shown) and connecting sleeve 6, therefore represents a diffuse air flow duct 2 as well as the flow space at swirl generator 15 outside of spot air flow duct 4 and within the housing (not shown), i.e., in the area of spiral air guiding devices 16. In FIGS. 1 and 2, in this regard, air flow 14 flowing into air vent 1 is shown with an arrow. Air can therefore be discharged as a diffuse or spot jet out of air vent 1 through diffuse outlet opening 3.

The air, which is discharged through spot air flow duct 4 within the spiral air guiding devices 16, flows into connecting sleeve 6 after being discharged. Connecting sleeve 6 in this case has an inflow opening 7 and an outflow opening 8. Outflow opening 8 of connecting sleeve 6 thereby represents a spot outlet opening 5 of air vent 1.

The cross-sectional area of connecting sleeve 6 at inflow opening 7 is thereby greater than the cross-sectional area at outflow opening 8. In this regard, connecting sleeve 6 has a conical shape with a decreasing diameter from inflow opening 7 to outflow opening 8. Because of the increased inflow opening 7 relative to outflow opening 8 of connecting sleeve 6, the air emerging from spot air flow duct 4 within the spiral air guiding devices 16 can be introduced essentially completely into connecting sleeve 6, so that in an advantageous manner essentially no leakage air occurs during the introduction of air into connecting sleeve 6. Connecting sleeve 6 further is pivotable around a vertical swivel axis 11. For this purpose, the ends of a corresponding axis pin for vertical swivel axis 11 are positioned at the housing (not shown) of air vent 1. Air vent 1 further has articulation points 13 as coupling elements at connecting sleeve 6. Arms of a kinematic system (not shown) or a mechanism can be hinged at articulation points 13, so that connecting sleeve 6 can be pivoted thereby about vertical swivel axis 11 (not shown) by the user of a motor vehicle, for example, by means of an adjustment wheel outside at air vent 1.

Connecting sleeve 6 further has a completely continuous center wall 10 as an air guiding wall 9 (FIGS. 3 and 5). Center wall 10 divides the flow space within connecting sleeve 6 into two, substantially equally sized partial flow compartments 12. Because center wall 10 is completely continuous within connecting sleeve 6, two partial flow compartments 12 form as a result, whereby no air within connecting sleeve 6 can flow from one partial flow compartment 12 to the other partial flow compartment 12. With a pivoting of connecting sleeve 6 about vertical swivel axis 11 (not shown), the air introduced at inflow opening 7 into connecting sleeve 6 is diverted. To avoid swirl formation within connecting sleeve 6, the flow space is divided advantageously into two smaller partial flow compartments 12 by center wall 10, so that the air within connecting sleeve 6 is canalized thereby and guided essentially parallel, so that thereby swirl formation within connecting sleeve 6 during deflection can be substantially ruled out, and thereby flowing of the air out of connecting sleeve 6 at outflow opening 8 as a spot jet is definitely assured, even with considerable pivoting of connecting sleeve 6.

Connecting sleeve 6 is formed within the diffuse air flow duct 2 (FIG. 3). In another exemplary embodiment that is not shown, air vent 1 in this case has two connecting sleeves 6, which are formed and arranged next to one another (which is not shown) within a larger diffuse air flow duct 2. In this case, with an air vent 1 of this type (not shown), the diffuse air flow duct 2 and the two connecting sleeves 6 are arranged within the housing (not shown).

Viewed overall, major advantages are associated with air vent 1 of the invention and the motor vehicle HVAC system of the invention. Outflow opening 8, which is enlarged relative to inflow opening 7, of connecting sleeve 6 makes it possible that leakage air for air as a spot jet, which is to be passed through connecting sleeve 6, is substantially reduced. Further, because of the division of the flow space within connecting sleeve 6 into partial flow compartments 12 also during considerable pivoting of connecting sleeve 6 a discharging of the air out of connecting sleeve 6 at outflow opening 8 as a spot jet is assured, because due to center wall 10 the air is guided parallel within connecting sleeve 6 also during considerable pivoting of connecting sleeve 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An air vent for a vehicle interior ventilation system, the air vent comprising:
    at least one diffuse air flow duct with at least one diffuse outlet opening configured to discharge air as a diffuse or swirling jet;
    at least one spot air flow duct with at least one spot outlet opening configured to discharge the air as a spot jet; and
    at least one movable connecting sleeve with an inflow opening and an outflow opening configured as a spot outlet opening, the at least one connecting sleeve forming the at least one spot air flow duct at the at least one spot outlet opening, and via movement of the at least one connecting sleeve, different outflow directions of the spot jet from the at least one spot outlet opening is adjusted,
    wherein, the at least one connecting sleeve has a greater cross-sectional area at the inflow opening than the outflow opening and at least one air guiding wall is formed in the at least one connecting sleeve.

2. The air vent according to claim 1, wherein the at least one connecting sleeve has a conical shape with a cross-sectional area that becomes smaller in the air flow direction.

3. The air vent according to claim 1, wherein the at least one connecting sleeve has a greater width and a greater height at the inflow opening than at the outflow opening.

4. The air vent according to claim 1, wherein the at least one connecting sleeve is pivotable.

5. The air vent according to claim 1, wherein the at least one air guiding wall is directed substantially parallel to an axis of the at least one connecting sleeve or an air flow direction in the at least one connecting sleeve.

6. The air vent according to claim 1, wherein the at least one air guiding wall is formed completely continuous within the flow space of the at least one connecting sleeve, so that the at least one air guiding wall divides the flow space within the at least one connecting sleeve into at least two separate partial flow compartments.

7. The air vent according to claim 1, wherein the at least one air guiding wall is formed as a center wall in the at least one connecting sleeve so that the center wall divides the flow space within the at least one connecting sleeve into only two totally separate, substantially equally large partial flow compartments.

8. The air vent according to claim 1, wherein a swirl generator is arranged in the flow direction upstream of the at least one connecting sleeve.

9. The air vent according to claim 1, wherein the at least one connecting sleeve is arranged within the at least one diffuse air flow duct and the air vent comprises a housing and wherein the at least one connecting sleeve is arranged within the housing and the at least one diffuse air flow duct is bounded by the housing.

10. A motor vehicle HVAC system, wherein the motor vehicle HVAC system comprises at least one air vent according to claim 1.

11. The air vent according to claim 1, wherein the cross sectional area of the inflow opening is 5-30% greater than the cross sectional area of the outflow opening.

12. The air vent according to claim 1, wherein the at least one air guiding wall is formed as a completely flat, vertical surface.

13. The air vent according to claim 7, wherein the center wall divides the flow space such that air does not flow from one flow compartment to another flow compartment.

* * * * *